(12) United States Patent
Jones et al.

(10) Patent No.: US 6,434,699 B1
(45) Date of Patent: Aug. 13, 2002

(54) ENCRYPTION PROCESSOR WITH SHARED MEMORY INTERCONNECT

(75) Inventors: David E. Jones, Ottawa; Cormac M. O'Connell, Kanata, both of (CA)

(73) Assignee: MOSAID Technologies Inc., Ontario (CA)

( * ) Notice: Subject to any disclaimer, the term of this patent is extended or adjusted under 35 U.S.C. 154(b) by 0 days.

(21) Appl. No.: 09/584,930

(22) Filed: Jun. 1, 2000

Related U.S. Application Data

(63) Continuation of application No. 09/032,029, filed on Feb. 27, 1998, now Pat. No. 6,088,800.

(51) Int. Cl.[7] .............................................. G06F 1/24
(52) U.S. Cl. ..................... 713/168; 713/200; 713/201; 380/28; 380/255
(58) Field of Search ................................ 713/168, 200, 713/201; 380/255, 28

(56) References Cited

U.S. PATENT DOCUMENTS

| | | | |
|---|---|---|---|
| 3,098,153 A | 7/1963 | Heijn | |
| 4,809,169 A | 2/1989 | Sfarti et al. .................. 364/200 |
| 4,922,418 A | 5/1990 | Dolecek ....................... 364/200 |
| 5,038,282 A | 8/1991 | Gilbert et al. ............... 364/200 |
| 5,239,654 A | 8/1993 | Ing-Simmons et al. ..... 395/800 |
| 5,301,340 A | 4/1994 | Cook ........................... 395/800 |
| 5,343,416 A | 8/1994 | Eisig et al. .................. 364/757 |
| 5,475,856 A | 12/1995 | Kogge ......................... 395/800 |
| 5,524,250 A | 6/1996 | Chesson et al. ............. 712/228 |
| 5,546,343 A | 8/1996 | Elliott et al. ................. 365/189 |
| 5,627,966 A | 5/1997 | Hanko .................... 395/185.02 |
| 5,636,351 A | 6/1997 | Lee ............................. 395/380 |
| 5,694,143 A | 12/1997 | Fielder et al. ............... 345/112 |
| 5,708,836 A | 1/1998 | Wilkinson et al. .......... 395/800 |
| 5,724,422 A | 3/1998 | Shang et al. .................... 380/4 |
| 5,864,683 A | 1/1999 | Boebert et al. .............. 709/249 |
| 5,907,714 A * | 5/1999 | Boutaud et al. ............. 712/23 |
| 5,917,912 A * | 6/1999 | Ginter et al. ................. 380/24 |
| 5,926,546 A | 7/1999 | Maeda et al. .................. 380/9 |
| 5,987,124 A | 11/1999 | Matyas, Jr. et al. ............. 380/4 |

FOREIGN PATENT DOCUMENTS

| | | |
|---|---|---|
| WO | WO89/07375 | 8/1989 |
| WO | WO91/18460 | 11/1991 |
| WO | WO99/14881 | 3/1999 |

OTHER PUBLICATIONS

Wolter, Stefan et al., "On the VLSI Implementation of the International Data Encryption Algorithm IDEA," IEEE International Symposium on Circuits and Systems (ISCAS), Seattle, WA, Apr. 30–May 3, 1995., vol. 1, Apr. 30, 1995, pp. 397–400.

(List continued on next page.)

*Primary Examiner*—Thomas R. Peeso
(74) *Attorney, Agent, or Firm*—Hamilton, Brook, Smith & Reynolds, P.C.

(57) ABSTRACT

An encryption chip is programmable to process a variety of secret key and public key encryption algorithms. The chip includes a pipeline of processing elements, each of which can process a round within a secret key algorithm. Data is transferred between the processing elements through dual port memories. A central processing unit allows for processing of very wide data words from global memory in single cycle operations. An adder circuit is simplified by using plural relatively small adder circuits with sums and carries looped back in plural cycles. Multiplier circuitry can be shared between the processing elements and the central processor by adapting the smaller processing element multipliers for concatenation as a very wide central processor multiplier.

4 Claims, 12 Drawing Sheets

OTHER PUBLICATIONS

Sauerbrey, J., "A Modular Exponentiation Unit Based on Systolic Arrays," Advances in Cryptology—Auscrpyt, Gold Coast, Queensland, Dec. 13–16, 1992, conf. 3, Dec. 13, 1992, pp. 505–516.

Barrett, Paul, "Implementing The Rivest Shamir and Adleman Public Key Encryption Algorithm on a Standard Digital Signal Processor," Computer Security LTD, Aug. 1986, pp. 311–323.

Montgomery, Peter L., "Modular Multiplication Without Trial Division," Mathematics of Computation, vol. 44, No. 170, Apr. 1985, pp. 519–521.

Jones, D. et al., "A Time–Multiplexed FPGA Architecture for Logic Emulation," Proceedings of the IEEE 1995 Custom Integrated Circuits Conference, May 1995, pp. 495–498.

Mirsky, Ethan et al., "MATRIX: A Reconfigurable Computing Architecture with Configurable Instruction Distribution and Deployable Resources," IEEE Symposium on FPGA's For Custom Computing Machines, Published at FCCM '96, Apr. 17–19, 1996, pp. 1–10.

Chen, Dev C., "A Reconfigurable Multiprocessor IC for Rapid Prototyping of Algorithmic–Specific High–Speed DSP Data Paths," IEEE Journal of Solid–State Circuits, vol. 27, No. 12, Dec. 1992, pp. 1895–1904.

Yeung, Alfred K. et al., "A 2.4GOPS Data–Driven Reconfigurable Multiprocessor IC for DSP," IEEE International Solid–State Circuits Conference, ISSCC95, Feb. 16, 1995, Session 6, Digital Design Elements, Paper TA 6.3, 3 pages.

* cited by examiner

ENCRYPTION PROCESSOR WITH SHARED MEMORY INTERCONNECT

RELATED APPLICATION(S)

This application is a Continuation of Ser. No. 09/032,029 filed Feb. 27, 1998 now U.S. Pat. No. 6,038,800, the entire teachings of which are incorporated herein by reference.

BACKGROUND OF THE INVENTION

Before the advent of the Internet, corporate data networks typically consisted of dedicated telecommunications lines leased from a public telephone company. Since the hardware implementation of the data networks was the exclusive property of the telephone company, a regulated utility having an absolute monopoly on the medium, security was not much of a problem; the single provider was contractually obligated to be secure, and the lack of access to the switching network from outside made it more or less resistant to external hacking and tampering.

Today, more and more enterprises are discovering the value of the Internet which is currently more widely deployed than any other single computer network in the world and is therefore readily available for use by a multinational corporate network. Since it is also a consumer-level product, Internet access can usually be provided at much lower cost than the same service provided by dedicated telephone company network. Finally, the availability of the Internet to the end user makes it possible for individuals to easily access the corporate network from home, or other remote locations.

The Internet however, is run by public companies, using open protocols, and in-band routing and control that is open to scrutiny. This environment makes it a fertile proving ground for hackers. Industrial espionage is a lucrative business today, and companies that do business on the Internet leave themselves open to attack unless they take precautions.

Several standards exist today for privacy and strong authentication on the Internet. Privacy is accomplished through encryption/decryption. Typically, encryption/decryption is performed based on algorithms which are intended to allow data transfer over an open channel between parties while maintaining the privacy of the message contents. This is accomplished by encrypting the data using an encryption key by the sender and decrypting it using a decryption key by the receiver (sometimes, the encryption and decryption keys are the same).

Types of Encryption Algorithms

Encryption algorithms can be classified into public-key and secret key algorithms. In secret-key algorithms, both keys are secret whereas in public-key algorithms, one of the keys is known to the general public. Block ciphers are representative of the secret-key cryptosystems in use today. Usually, for block ciphers, the encryption key is the same as the decryption key. A block cipher takes a block of data, typically 32–128 bits, as input and produces the same number of bits as output. The encryption and decryption are performed using a key, anywhere from 56–128 bits in length. The encryption algorithm is designed such that it is very difficult to decrypt a message without knowing the key.

In addition to block ciphers, Internet security protocols also make heavy use of public-key algorithms. A public key cryptosystem such as the Rivest, Shamir, Adelman (RSA) cryptosystem described in U.S. Pat. No. 5,144,667 issued to Pogue and Rivest uses two keys, only one of which is made public. Once someone publishes a key, anyone may send that person a secret message using that key. However, decryption of the message can only be accomplished by use of the secret key. The advantage of such public-key encryption is secret keys do not need to be distributed to all parties of a conversation beforehand. In contrast, if only secret-key encryption were used, multiple secret keys would have to be generated, one for each party intended to receive the message, and each secret key would have to be privately communicated. Attempting to communicate the secret key privately results in the same problem as in sending the message itself using only secret-key encryption; this is called the key distribution problem.

Key exchange is another application of public-key techniques. In a key exchange protocol, two parties can agree on a secret key even if their conversation is intercepted by a third party. The Diffie-Hellman exponential key exchange, described in U.S. Pat. No. 4,200,770, is an example of such a protocol.

Most public-key algorithms, such as RSA and Diffie-Hellman key exchange, are based on modular exponentiation, which is the computation of $\alpha^x$ mod p. This expression means "multiply $\alpha$ by itself X times, divide the answer by p, and take the remainder." This computation is very expensive to perform, for the following reason. In order to perform this operation, many repeated multiplications and divisions are required, although techniques such as Montgomery's method, described in "Modular Multiplication Without Trial Division," from Mathematics of Computation, Vol. 44, No. 170 of April 1985, can reduce the number of divisions required. In addition, the numbers used are very large (typically 1024 bits or more), so the multiply and divide instructions found in common CPUs cannot be used directly. Instead, special algorithms that break down the large multiplications and divisions into operations small enough to be performed on a CPU must be used. These algorithms usually have a run time proportional to the square of the number of machine words involved. These factors result in multiplication of large numbers being a very slow operation. For example, a Pentium® can perform a 32×32-bit multiply in 10 clock cycles. A 2048-bit number can be represented in 64 32-bit words. A 2048×2048-bit multiply requires 64×64 separate 32×32-bit multiplications, which takes 40960 clocks on the Pentium. An exponentiation with a 2048-bit exponent requires up to 4096 multiplications if done in the normal way, which requires about 167 million clock cycles. If the Pentium is running at 166 MHZ, the entire operation requires roughly one second. This example does not consider the time required to perform the divisions, either! Clearly, a common CPU such as a Pentium cannot expect to do key generation and exchange at any great rate.

Because public-key algorithms are so computationally intensive, they are typically not used to encrypt entire messages. Instead, private-key cryptosystems are used for message transfer. The private key used to encrypt the message, called the session key, is chosen at random and encrypted using a public key. The encrypted session key, as well as the encrypted message, are then sent to the other party. The other party uses its secret key to decrypt the session key, at which point the message may be decrypted using the session key. A different session key is used for each communication, so that if one session key is ever broken, only the one message encrypted with it may be read. This public-key/private-key method can also be used to protect continuous communications, such as interactive terminal sessions that never terminate in normal operation. In this case, the session key is periodically changed (e.g. once an hour) by repeating the public-key generation technique.

Again, frequent changing of the session key limits the amount of data compromised if the encryption is broken.

Prior Art

Network-level encryption devices, allowing access to corporate networks using a software-based solution are experiencing widespread usage. Products such as Raptor Eagle Remote and others perform encryption entirely in software. The software limits the encryptor's throughput. Session key generation using public-key techniques may take several minutes. For this reason, session keys are not re-generated as often as some people would like. However, software does have the advantage that the encryption algorithms are easily changed in response to advances in the field.

Other devices use a combination of hardware and software. For example, the Northern Telecom (now Entrust) Sentinel X.25 encryption product uses a DES chip produced by AMD to perform the DES secret-key encryption. Hardware implementations of DES are much faster, since DES was designed for efficient implementation in hardware. A transposition that takes many CPU instructions in software can be done using parallel special-purpose lookup tables and wiring.

The Sentinel also makes use of a Motorola DSP56000 processor to perform the public-key operations. At the time, the single-cycle multiplication ability of the DSP made this approach significantly faster than implementing the public-key algorithms on regular CISC microprocessors.

Most hardware encryption devices are severely limited in the number of algorithms that they can implement. For example, the AMD chip used in the Sentinel performs only DES. More recent devices, from Hi/Fn can perform DES and RC4. However, if you need to implement either RC5 or IDEA, then you would need to use another product.

SUMMARY OF THE INVENTION

A preferred high-performance programmable network encryption device, integrated into a single chip, is a parallel-pipelined processor system whose instruction set is optimized for common encryption algorithms. The present invention realizes the advantages of both hardware and software approaches. Since the processor is a programmable processor, any encryption algorithm may be implemented, contrary to a hardware implemented encryption processor which is dedicated to executing only one algorithm. However, the processor's architecture permits parallel computations of a nature useful for encryption, so its performance more closely approximates that of a dedicated hardware device.

In accordance with a preferred implementation of the invention, an electronic encryption device comprises an array of processing elements. Each processing element comprises an instruction memory for storing a round of an encryption algorithm, the round comprising a sequence of instructions. The processing element also includes a processor for implementing the round from the instruction memory and data storage for storing encryption data operands and encrypted data resulting from implementing the round. Each processing element of the array implements one of the rounds and transfers results to successive processing elements such that the array of processing elements implements successive rounds of the encryption algorithm in a processing element pipeline.

In a preferred embodiment, the data storage has a portion thereof which is shared between adjacent processing elements of the linear array for transfer of data between adjacent processing elements of the linear array. The shared data storage is preferably comprised of dual port memories but may also comprise shared registers.

The preferred processing element comprises a control unit and an ALU. The control unit, ALU, instruction memory and data storage, including local data memory and shared data memory, are connected to a local processing element bus. The local bus is segmented by a switch into a local instruction bus segment, connecting the instruction memory and the control unit, and a local data bus segment connecting the ALU, local data memory and shared data memory. The switch permits either independent simultaneous operation on the two local bus segments or a communication between the two bus segments. Each processing element further comprises a multiplier for performing multiplication operations within the processing element.

The preferred encryption device further comprises a global random access memory and a global bus through which data is transferred between the global random access memory and the processing element data storage. A central processor is coupled to the global bus for processing data words which are wider than data words processed by the processing elements. The multipliers of the plural processing elements may be adapted for concatenation as segments of a wider multiplier used by the central processor. Preferably, each multiplier comprises partial product adders having input selection circuitry for selecting a first set of inputs when operating as an individual multiplier and a second set of inputs, including inputs from adjacent processing elements, when concatenated.

Preferably, the central processor comprises a novel adder. In the adder, each of plural adder segments has a carry output and a sum output and each of the adder segments processes a segment of each of two operands. Selectors select the carry outputs as carry inputs to successive adder segments for successive clock cycles so long as any carry results in an adder cycle. Selectors also select each sum output as an operand input to the same adder segment. Accordingly, so long as any carry results in an adder cycle, the sum output of an adder is fed back to its input, and the adder segment receives a carry input generated as a carry output from a preceding segment in a preceding cycle.

Preferably, each processing element performs a modular adjust operation to compute M mod N without using a divide circuit. Each processing element also performs a modulo add/subtract operation to compute A±B mod N. Further, each processing element performs a modulo multiply operation to compute A×B mod N.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The encryption chip of the present invention may be programmed to perform common data encryption and decryption algorithms on one or more data streams in any application. The principal purpose of the encryption chip is to perform high speed data encryption using algorithms that are expected to be in use on the Internet, at data rates of 100–2000 Mbps.

Figure 1A:
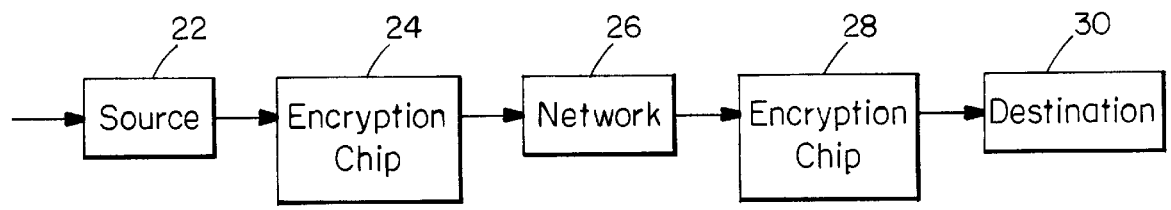
FIGS. 1A and 1B are block diagrams of potential applications of the present invention.
Figure 1B:
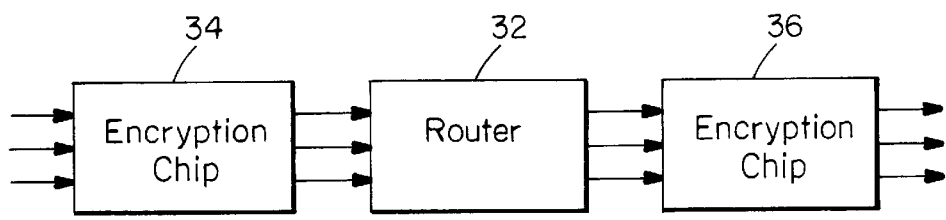

Example applications are illustrated in FIGS. 1A and 1B. In FIG. 1A, data from a source 22 is encrypted in an encryption chip 24 before the data is passed into a public network 26. The data is then decrypted in encryption chip 28 before being forwarded to a destination 30. In one embodiment, the source and the destination are themselves networks such as local area networks. In that case, the encryption chips provide a secure path between the local area networks and the public network 26.

In a link encryption application illustrated in FIG. 1B, data transferred within each link between routers is encrypted. In that case, encrypted data received at a router 32 between links must first be decrypted in an encryption chip 34, and the data is re-encrypted in accordance with the encryption algorithm of the next link in an encryption chip 36.

Three main secret-key block encryption algorithms are in common use today: DES, RC5 and IDEA. The first two algorithms are standard Internet Protocol SECurity IPSEC standard algorithms. IDEA is the algorithm used by PGP, a popular email encryption program.

Typically, block algorithms consist of a number of rounds; each round is a sequence of operations in an encryption algorithm. Anywhere from 8–32 rounds are required to completely implement an encryption algorithm. The operations performed by each round are often the same, although they need not be. In software, each round is implemented with a few machine instructions. In hardware, each round is implemented with dedicated circuitry. The hardware is typically pipelined, with each round being implemented in its own pipeline stage.

Figure 2:
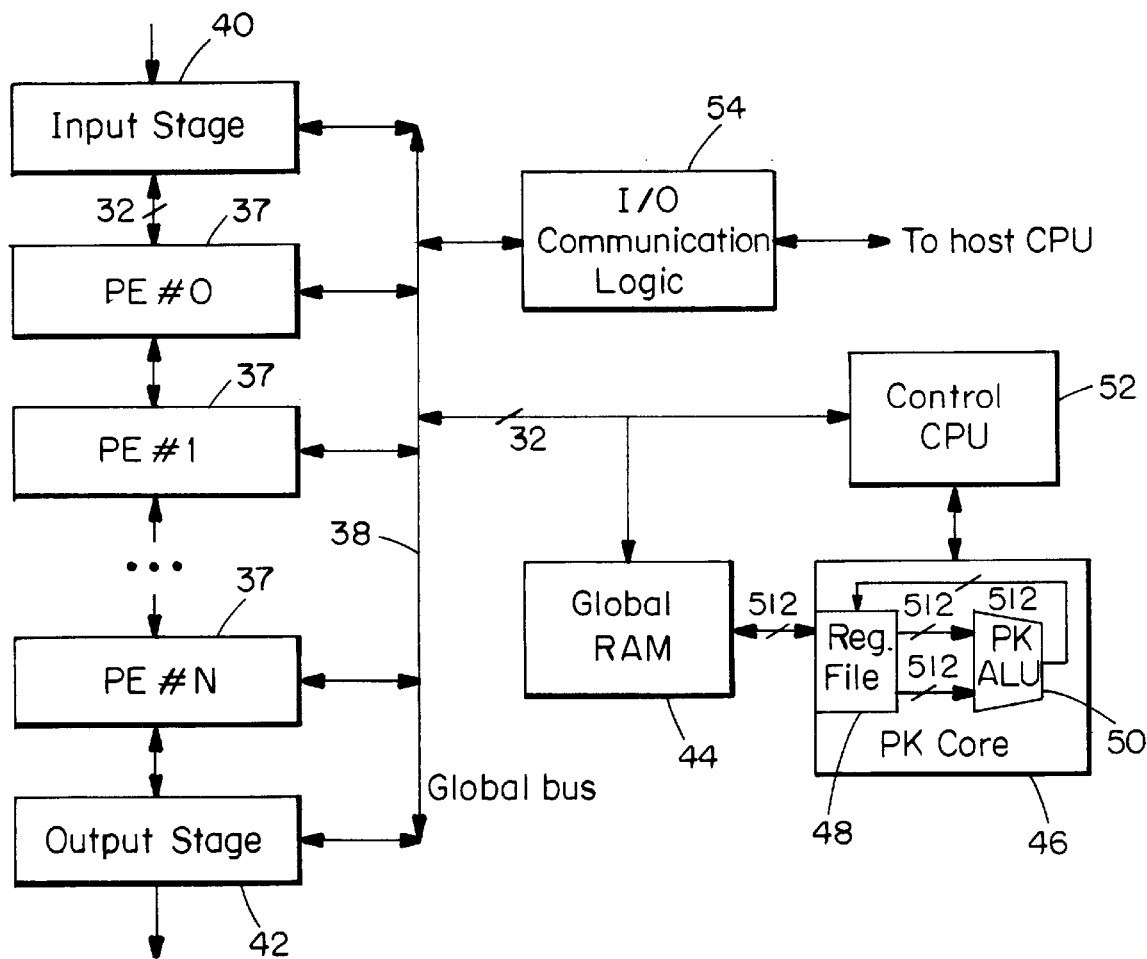
FIG. 2 is a block diagram of an encryption chip embodying the present invention.

FIG. 2 illustrates an integrated chip solution, henceforth referred to as the encryption chip, according to an embodiment of the present invention. Although the encryption chip implies the chip can perform encryption, it should be noted that the chip is also designed to perform decryption and message digest functions as well.

Data enters the encryption chip through an input stage 40, which receives network data, typically as a serial bit stream. Ethernet, ATM or any other serialized format may be used. The input stage converts the serial data stream to block-aligned data suitable for processing as an input to an encryption/decryption pipeline. The size of the input blocks is programmable. In the preferred embodiment illustrated in FIG. 2, the pipeline is made up of a plurality of processing elements 37 arranged in a linear array, each containing an instruction memory, a register file, an ALU, local and shared data memory, and control circuitry. Each of the processing elements is designed to process 32-bit wide data words. The encrypted data is taken from the last processing element in the pipeline into an output stage 42, which converts the block data back into a serial stream format and forwards the data over the network or to a local destination.

Data can be transferred among non-adjacent processing elements and/or other elements within the encryption chip via a global data bus 38. Also connected to the global data bus 38 is I/O communication logic 54, which allows communication with a host CPU (not shown). Host CPU communication is required to program the encryption chip prior to use. Global random access memory (RAM) 44 is also connected to the global data bus 38, allowing global communication among the processing elements. A control CPU 52 synchronizes the operations of the encryption pipeline processors. This CPU may be implemented using any available embedded CPU core such as MIPS, ARM or ARC. Furthermore, to allow processing of algorithms which utilize very wide operands such as public-key encryption algorithms, a public-key (PK) core processor 46 is connected to the control CPU 52. The PK core includes a register file 48 consisting of 8–16 512-bit wide registers as well as a PK ALU 50. The PK core processor can make data transfers to and from the global RAM 44 over a 512-bit bus in one system clock cycle. 512-bit operands are processed in the ALU 50, typically in 2–32 clock cycles. The PK core ALU 50 is a coprocessor controlled by the control CPU 52, performing only arithmetic and logic operations along with loads and stores. Other instructions necessary for implementing PK algorithms can be executed within the control CPU 52.

The encryption chip implements the code for each round of a secret key algorithm in a separate processing element of the pipeline. Once computed upon, data from one PE is transferred to the next PE where the next round is implemented. The first PE is then free to process an encryption round for the next block of data coming in. The pipeline process continues for the remaining PE's. The time required to encrypt a block using this architecture is therefore equal to the time required to encrypt one round.

Many block algorithms use one set of operations to encrypt the data, and a separate set of operations to expand the key. Key expansion is the process of transforming a relatively small key (56–128 bits) into a larger number (512 bits or more) with statistically random properties. This expanded key is distributed into smaller subkeys, where a different portion of the expanded key is used for each round. It is important to note that the expanded key does not change with the data. Therefore, since it is not in the critical path, it can be pre-computed and stored in memory. The sample code discussed later assumes that key information has been pre-computed and stored in the local data memories of each PE.

The basic application of a block algorithm transforms a block of plaintext (unencrypted information) into a similar-sized block of ciphertext (encrypted information) and vice-versa. This operating mode is known as electronic codebook (ECB) mode. Due to its many inherent security weaknesses, methods of introducing feedback into the encryption by cycling some of the basic output back into the input are commonly used. The encryption chip uses the global data bus 38 to perform cipher feedback (CFB). In ECB mode, a new block of data can be encrypted once per pipeline cycle, which can be 10–100 instructions. However, in CFB mode, each datum must pass through the pipeline multiple times. This mode substantially reduces throughput on a single channel. However, peak performance can be achieved by encrypting multiple data channels, interleaved in the pipeline.

Figure 3:
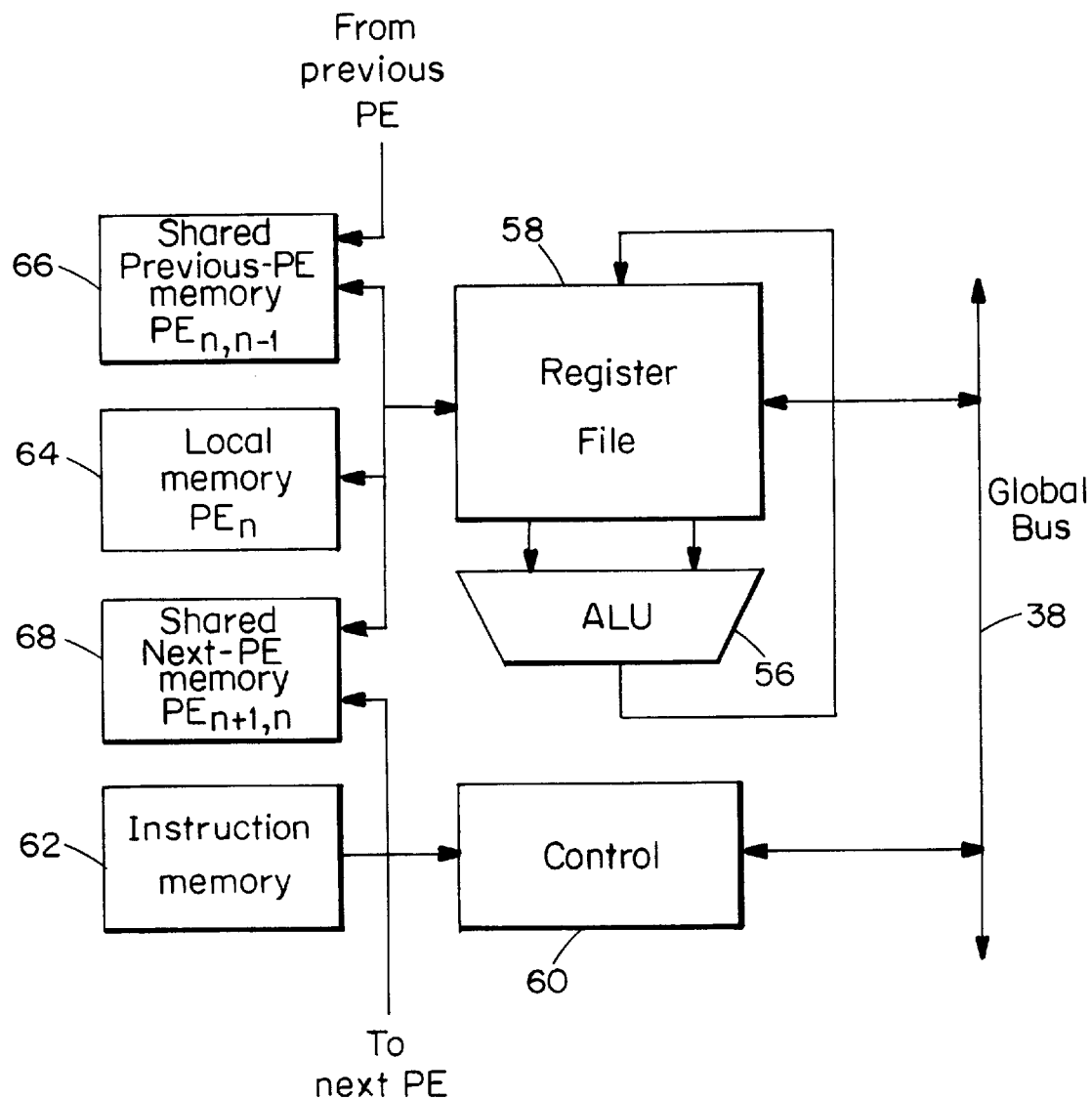
FIG. 3 is a block diagram of a processing element in the encryption chip of FIG. 2.

A block diagram of one individual processing element PE according to an embodiment of the present invention is shown in FIG. 3. The processing element 37, consists of an ALU 56 operating on 32-bit words from a register file 58 made up of 8–16 32-bit registers. The register file 58 and ALU 56 are controlled by a control unit 60 which decodes instructions from a processing element instruction memory 62. Each processing element instruction memory stores at least one round of an encryption algorithm, where a round is defined as a sequence of instructions in an encryption algorithm. The PE data memory space accessible by each processing element is divided into four areas: a local PE memory 64 (in FIG. 3, designated as $PE_n$ local memory), a shared memory 66 (in FIG. 3, designated as $PE_{n,n-1}$ shared memory shared between the n-th and n−1-th processing element), and a second shared memory 68 (in FIG. 3, designated as $PE_{n+1,n}$ shared memory shared between the n+1-st and n-th processing element), and the global memory 44 as described with reference to FIG. 2, which is accessible to all PEs. All of these memories are mapped into the address space of a processing element, say the n-th processing element. No special instructions are required to access any type of memory; all memories are accessible by all memory access instructions.

The memories 66 and 68 of a processing element are dual port SRAMs and are shared with the PE of the previous and next pipe stage, respectively. Note that a PE's next-neighbor memory is the same as the next PE's previous-neighbor memory.

These dual ported SRAMs are used to propagate data through the pipeline stages. One processing element writes data to be transferred into its associated next-neighbor shared memory. Then the next-neighbor processing element reads the stored data from its previous-neighbor shared memory, which as described before, is one and the same as the previous processing element's next-neighbor shared memory. Since the memories are dual-ported, there are no timing restrictions on accesses. Synchronization of accesses is performed using static scheduling of machine instructions by the software author or compiler. Furthermore, since the global bus is not used for communication between adjacent PEs, the PEs may all communicate concurrently.

The global memory 44 is connected to the global communication bus. Only one processing element is allowed to access the global memory 44 at any one time. This memory is used to pass data between non-adjacent processing elements, for example, during feedback encryption algorithms and can serve as supplemental storage for individual processing elements.

The PE instruction memory 62 has an instruction set resembling that of a modem RISC processor integer unit. The instruction set is more or less orthogonal in that any register can be used as an operand to any instruction. No floating-point or memory management support need be provided, since neither are useful in encryption. However, the instruction set contains the following useful enhancements: a modular addition/subtraction instruction, a modular multiplication instruction and a modulo adjust instruction.

The modular addition/subtraction instruction computes A±B mod N (the number "M mod N" is the remainder when M is divided by N). FIGS. 15A through 15D illustrate the combination of the modular add, subtract and adjust into one 3-in-1 modulo arithmetic unit.

Figure 15A:
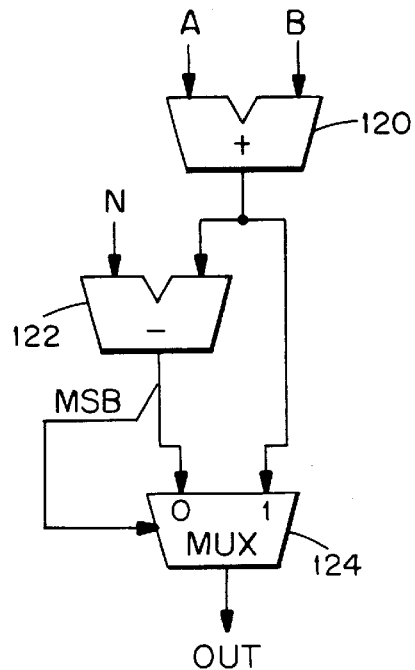
FIGS. 15A–D are functional diagrams illustrating modular add, subtract, adjust and combination of all three operations according to embodiments of the present invention.
Figure 15B:
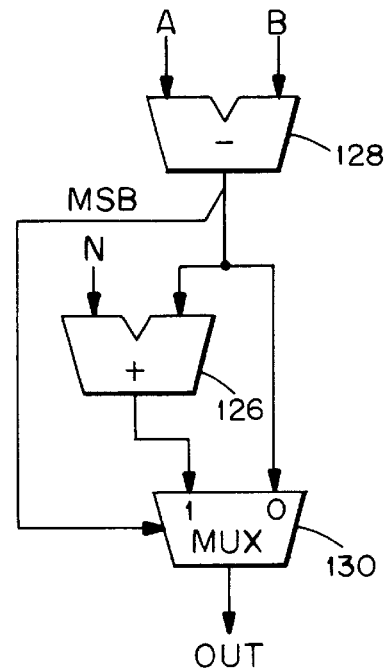

FIG. 1A illustrates the modular add operation. If the two numbers to be added, A and B, are both less than N, then their sum from adder 120 can be reduced modulo N by subtracting N in subtractor 122, and then selecting through the multiplexer 124 either the output of the subtractor or the original number, depending on the sign of the difference. Similarly, in the case of a modular subtract operation as shown in FIG. 15B, if the two numbers A and B are less than N, then their difference modulo N can be computed by adding N in adder 126 if the difference from subtractor 128 is negative or by selecting the difference through multiplexor 130 if the difference is positive. Note that both the modulo add and modulo subtract do not require division. However, they do require two additions in series (one to compute the sum/difference, and one to reduce modulo N). If the double-addition impacts the critical path, then the reduction modulo N can be encoded as a separate instruction, which is called the "modulo adjust" instruction.

Figure 15C:
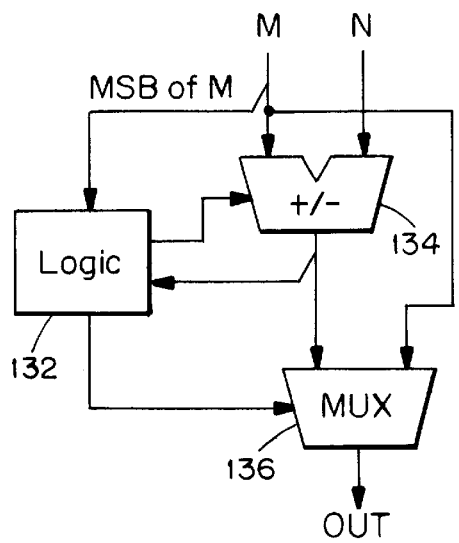

The modulo adjust instruction, illustrated in FIG. 15C, computes M mod N, given that M is either a sum or a difference of A and B, both already reduced to mod N. If M is negative, the logic 132 causes adder/subtractor 134 to add N to M to produce the result through multiplexor 136. If M is positive, then logic 132 causes subtraction of N, and returns the difference if it is positive or M if the difference is negative. This instruction may be used in conjunction with sum and difference instructions to render the modular addition/subtraction instruction unnecessary.

Figure 15D:
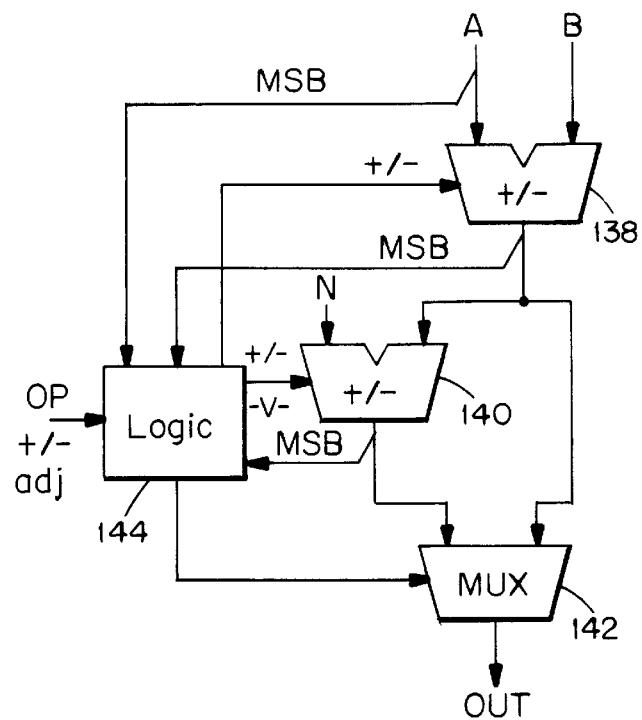

In FIG. 15D, the 3-in-1 arithmetic unit combines the modulo add, modulo subtract and modulo adjust into a single unit which is implemented within each processing element. Under control of logic 144 responding to an instruction (modular add, subtract or adjust) and most significant bit (MSB) sign inputs, adder/subtractor 138 serves the function of either of devices 120 and 128, and adder/subtractor 140 serves the function of any of devices 122, 126 and 134. Multiplexor 142 corresponds to devices 124, 130 and 136. In the modulo adjust operation, M is applied to the A input and the B input is set at zero. This combined unit is most efficient in area at the cost of speed. This combined unit is also useful in implementing Montgomery's method for modular multiplication without trial division, "Modular Multiplication Without Trial Division," by Peter L. Montgomery, *Mathematics of Computation*, Vol. 44, No. 170, April 1985, pages 519–521.

Although modular addition and subtraction can be performed on conventional processors using only 2–3 instructions, the inclusion of these instructions as special functions of the encryption chip instruction set offers a minor speedup for the specific case of encryption algorithms.

The modular multiplication instruction computes A*B mod N. The multiplier used for this instruction will be described in more detail below. The encryption chip provides a full modular multiply instruction, for reasons which will become clear below.

Table 1 gives a representative sample of the instruction set of the PEs to be used in subsequent examples. Other conventional RISC instructions may also be implemented.

TABLE 1

Sample Instruction Set

| Instruction | Description |
| --- | --- |
| load rn, addr | Load register n with memory |
| store rn, addr | Store register n in memory |
| xor r1, r2, r3 | r1 = r2 xor r3 |
| add r1, r2, r3 | r1 = r2 + r3 |
| rol r1, r2, r3 | r1 = r2 <<< r3 (<<< is the Java operator for a rotate instruction. For a 32-bit operand, bit 31 rotates to bit position 0) |
| xor r1, addr | r1 = r1 xor memory[addr] |
| add r1, addr | r1 = r1 + memory[addr] |
| rol r1, addr | r1 = r1 <<< memory[addr] |
| moda r1, r2 | Modulo adjust: r1 = r1 mod r2, where r1 is result of modular add or multiply |
| moda r1, addr | r1 = r1 mod memory[addr] |
| mul r1, r2, r3 | Multiply: r1 = r2 × r3, performed in 32 bits. |
| mulm r1, r2, r3, r4 | Modular multiply: r1 = r2 × r3 mod r4. |
| Jump label | Transfer control unconditionally to label |
| sync label | Pipeline sync: wait until all PEs have arrived at a "sync" instruction, then branch to label |
| Dbra rn, label | rn = rn − 1; if rn != 0 then jump to label |
| cbra r1 cond r2, label | Compare and branch: compare r1 and r2, and branch to label if condition is true. "Cond" is one of ==, !=, <, >, <= or >=. |

Layout Issues

Figure 4:
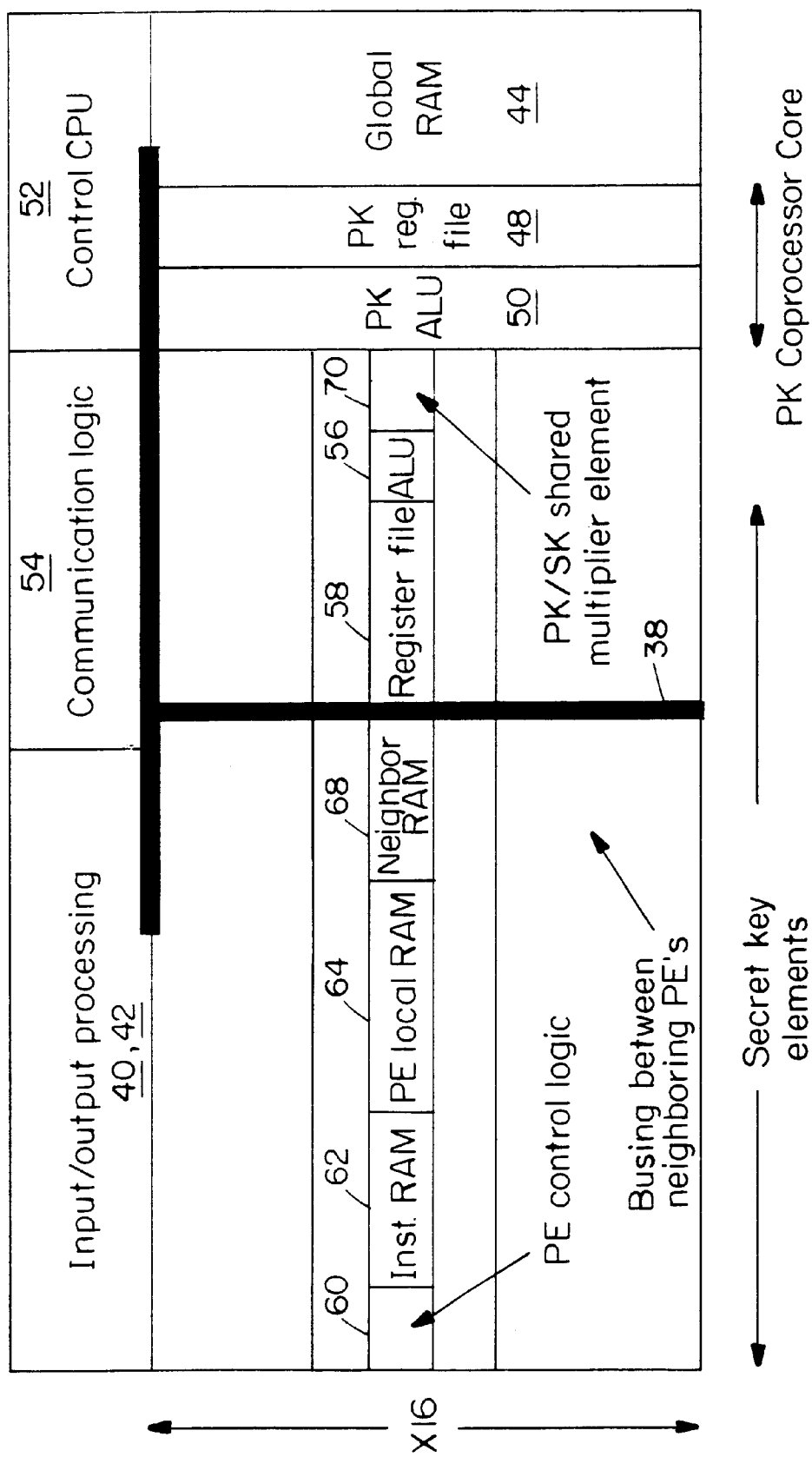
FIG. 4 illustrates a preferred chip layout of the circuitry of FIGS. 2 and 3.

A general layout of the encryption chip is illustrated in FIG. 4, assuming 16 processing elements and a 512-bit wide public key PK core unit. The PK core word width of 512 bits was chosen due to its layout convenience. A width of 1024 bits for example, would require more silicon area but would also double performance.

The individual elements can be compared to the elements of FIGS. 2 and 3. Sixteen of the processing elements are linearly arranged in a column in the large region of the layout to the lower left, one being shown in detail. The shared multiplier element is shown associated with the illustrated processing element. As previously described, a 32×32 multiplier segment 70 is associated with each processing element for performing 32-bit multiplications within the respective processing elements. Alternatively, the multiplier elements 70 can be concatenated to serve as a wide 512×32 bit multiplier for the public-key ALU 50. The public-key PK ALU 50 is located to the right of the secret-key SK elements, made up of the processing elements as described above. Next to the PK ALU is the PK register file 48. Together, the PK ALU 50 and the PK register file 48 make up the PK processing core, identified in FIG. 2 as 46. To the right of the PK core is located the global memory (RAM) 44. Along the top of the chip are the control CPU 52, the communication logic 54 and the input and output processing blocks 40 and 42. The global data bus 38 links the SK elements, the PK core 46, the global RAM 44, the communication logic 54 and the control CPU 52.

Figure 5:
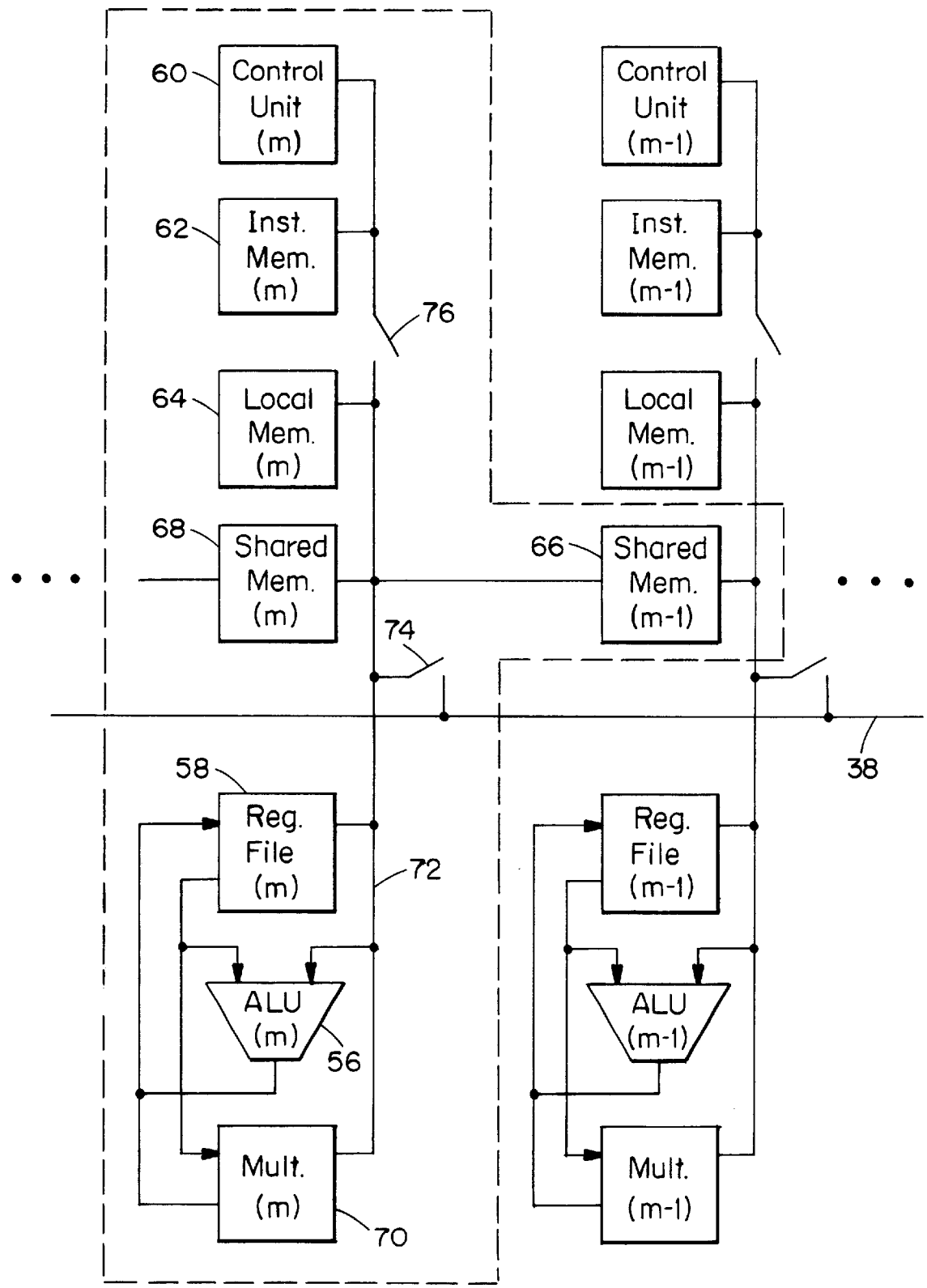
FIG. 5 illustrates the processing element of FIG. 3 redrawn to correspond to the layout of FIG. 4 and to illustrate the PE local bus and global bus connections.

The layout of a typical processing element with the local bus connections is shown in FIG. 5. All components of a processing element may communicate via a local processing element data bus 72, which handles all the memory-register transfers. Note that the next-neighbor shared PE memory 68 is laid out in line with the other elements of the illustrated processing element, whereas, the previous-neighbor shared PE memory 66 is laid out in line with the elements of the previous-neighbor processing element. For programming and testing purposes, all PE memories are accessible from the global bus 38. A switch 74 normally disconnects the local bus 72 from the global bus 38 but may be selectively closed to enable data transfer between the local RAM 64 and the global RAM 44. Another switch 76 allows the local bus 72 to be segmented into independent segments such that the control unit 60 can read instructions from the RAM 62 simultaneously with transfer of data on the bus 72. As such, operations within the processing element may be pipelined with one instruction being processed in the control unit while a prior instruction is executed in the PE ALU 56. During execution of encryption code, switches 74 and 76 are normally open, so that instruction fetches from the instruction RAM may proceed concurrently with data fetches from the data memories and register file.

Many multiprocessor architectures have been proposed. Most of them are designed for general-purpose multiprocessing, so communication between processing elements is usually done using a switching matrix that can be dynamically configured to switch data from any one PE to any other. These switch designs are extremely complex. Since they are not required for encryption, an embodiment of the present invention uses a simpler linear arrangement of the PEs with much less switching circuitry.

In addition, the use of shared memory as the interconnect technique rather than I/O ports as documented in the literature produces a much simpler and more powerful programming model. Consider two PEs, A and B, connected with a single 32-bit I/O port. In order for A to transfer multiple words of data to B, A must write each word to the I/O port and wait for B to read it. In contrast, if A and B are connected by a shared memory large enough to hold all words of the communication, then A may write out its data without waiting for B to read any. Furthermore, PE B has the freedom to read the words out in any order, or to pick and choose from the data as required by the job at hand. Finally, it should be noted that if some of the shared memory is not required for communication, then it may be used as an extension of the local memory to provide additional local work space.

Public Key Support

Efficient public-key encryption requires efficient modular exponentiation, provided by the public-key co-processor. This unit comprises the following items:

PK register file 48, consisting of 16 512-bit wide registers

PK 512×32-bit multiplier 70 made up of concatenated SK multiplier elements (this unit can perform a 512×512 multiply in only 32 clock cycles)

PK 512-bit adder ALU 50 which can perform addition in 2–16 cycles, typically no more than 2 global memory 44 organized for 512-bit parallel access from the PK coprocessor for loading and storing 512-bit words in a single clock cycle The PK core processor accelerates modular multiplication by performing it using 512-bit words. A 512×512 multiply operation using the PK unit of the invention would be implemented by performing 16 512×32 multiplies using the concatenated multiplier elements of the 16 processing elements described below. Assuming each multiply requires 2 clock cycles and 16 such multiplies are required, a 512×512 multiply would require 32 clock cycles and a 2048×2048 multiply would require only 512 clock cycles. The full modular exponentiation operation, requiring 4096 multiplies, would take a total of 2 million clock cycles. This represents an 80 fold improvement to the Pentium example discussed earlier. The performance improvement of PK algorithms is expected to be similar. This represents a significant performance gain compared to the prior art, and will enable more frequent changing of session keys, thereby increasing security.

512-bit Adder

Adders are not shared between the public key PK and secret key SK units. Rather, since addition and logic operations are common for both PK and SK, each unit has its own adder, so that operations may proceed concurrently.

Figure 6:
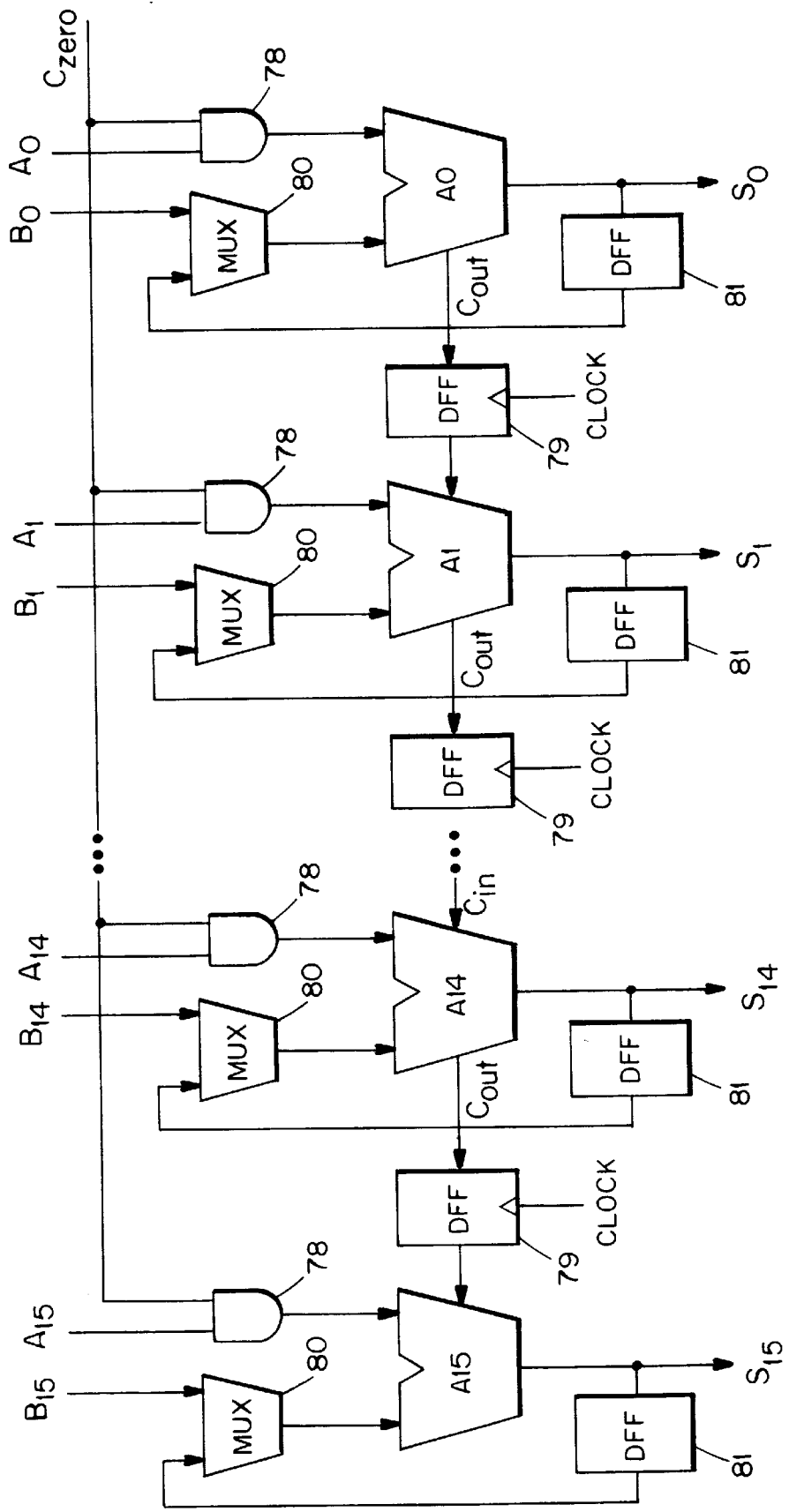
FIG. 6 illustrates an adder circuit used in the PK ALU of FIG. 2.

Within the public-key PK ALU 50, a 512-bit single cycle adder would be extremely complex and would add substantially to the critical path time of the ALU. Accordingly, the 512-bit adder in the ALU 50 is formed of 16 32-bit adders as illustrated in FIG. 6. In operation, the AND-gate 78 and multiplexer 80 initially apply two 32-bit operand segments to each of the 32-bit adders A0–A15. Note that the AND-gate gate 78 represents a 32-bit wide operation. Each 32-bit adder computes a 32-bit sum along with a carry output. The carry output of one adder is connected through a D flip-flop flop 79 to the carry input of the next. If a carry is generated in the first cycle, then it is clocked into the flip-flop where it is available as a carry input for the next clock cycle. Each sum is returned to one input of the same adder through a D flip-flop 81 and multiplexer 80; the other input of the adder is held at zero using the AND gate 78 during successive clock cycles. The step of adding back the sum as a carry input for each adder is repeated as long as any carry results at the output of any of the 32-bit adders.

The operation of the 512-bit adder can be better understood with reference to the following example using four 4-bit binary words instead of the 16 32-bit words of the actual implementation.

| Add: | 1101 | 0110 | 1001 | 011 | |
|---|---|---|---|---|---|
| | 0001 | 0101 | 1100 | 1011 | |
| | 01110 | 01011 | 10101 | 10110 | carry-outs are 0, 0, 1, 1 |
| | 1110 | 1011 | 0101 | 0110 | |
| | 0 | 1 | 1 | 0 | previous carries |
| | 1110 | 1100 | 0110 | 0110 | final sum |

Note that two additions were required to arrive at the final sum where no further carries resulted. This is a typical case. Since the adder is being used for encryption operations, it is safe to assume that the numbers being added are more or less randomly distributed. The probability of a carry-out after the first add is quite high. However, the probability that a carry, added back in as a least significant bit, will result in another carry from the most significant bit is quite low. For this reason, most add operations are expected to take only two clock cycles.

Returning to the original problem of constructing a 512-bit adder, if a standard carry lookahead or carry bypass adder design were used, the critical path through the adder would be quite long, since the carry must propagate through some optimized circuitry that operates on 512 bits. This adder would be quite large and slow. In contrast, in one embodiment of the present invention, a 512-bit adder is composed of 32-bit adders, whose design is well-known today and has been well optimized. The maximum clock speed of an individual 32-bit adder is expected to be more than twice that of a 512-bit carry lookahead design. Thus, the two-or-more cycle adder according to the invention, would on average operate faster than a large 512-bit adder, while consuming less chip area.

In a worst case, as illustrated below, it is possible that 16 cycles would be required to completely compute the final sum without carries, for 16 32-bit adders implementation. Using the 4-bit binary word example once again for illustrative purposes:

| Add: | 1111 | 1111 | 1111 | 1111 | |
|---|---|---|---|---|---|
| | 0000 | 0000 | 0000 | 0001 | |
| | 01111 | 01111 | 01111 | 10000 | $1^{ST}$ carry-outs are 0, 0, 0, 1 |
| | 1111 | 1111 | 1111 | 0000 | |
| | 0 | 0 | 1 | 0 | |
| | 01111 | 01111 | 10000 | 00000 | $2^{nd}$ carry-outs are 0, 0, 1, 0 |
| | 1111 | 1111 | 0000 | 0000 | |
| | 0 | 1 | 0 | 0 | |
| | 01111 | 10000 | 00000 | 00000 | $3^{rd}$ carry-outs are 0, 1, 0, 0 |
| | 1111 | 0000 | 0000 | 0000 | |
| | 1 | 0 | 0 | 0 | |
| | 10000 | 0000 | 0000 | 0000 | |

Four additions were required. In general, for n groups of numbers, at most, n additions will be required.

512×32 Multiplier

Multipliers are large in area. Each secret-key processing element must contain its own multiplier in order to implement any secret key algorithm requiring multiplication, for example IDEA which will be discussed in more detail below. The area taken by each PE multiplier collectively is significant and as a result, use of this area is made in implementing the 512×32-bit public key multiplier. To save area, the large 512×32 multiplier is implemented by concatenating the 16 32×32 multipliers in each secret key processing element. In other words, the secret and public key units can share the multiplier elements, as is illustrated in the layout of the chip in FIG. 4. Use of the multiplier elements must therefore be coordinated between the secret key processing elements and the PK core processor since the PK core processor cannot perform a multiply operation when any one of the secret key processing elements is itself independently performing a multiply operation.

To illustrate the concatenation of the multipliers, a simple design of a combination 4×4/4×N multiplier is illustrated below. Note that more advanced techniques of multiplier design such as Booth encoding and 4:2 compressors are available. The following example provides a simple presentation:

| | | |
|---|---|---|
| | 1011 | |
| × | 0100 | |
| | 0000 | |
| | 1011 | Partial Products |
| | 1011 | |
| | 0000 | |
| | 1000010 | |

Single-digit multiplication can be easily implemented by using an AND gate. The result, when using two 4-bit operands, consists of 16 bits of partial product. These partial products must be added together efficiently. The partial products could, for example, be added using two 4-bit and one 6-bit full adder, but they would take a substantial time to perform the addition of the partial products, since the carry may have to propagate through several adders. The overall result of such an adder implementation would be too slow. A better approach would consist of an adder whose carry has to go through fewer stages.

Figure 7:
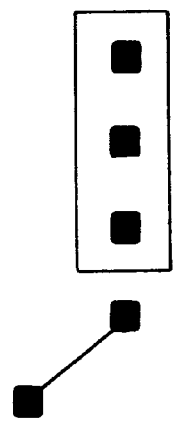
FIG. 7 illustrates a full adder symbol used in a multiplier of the PK ALU.
Figure 8:
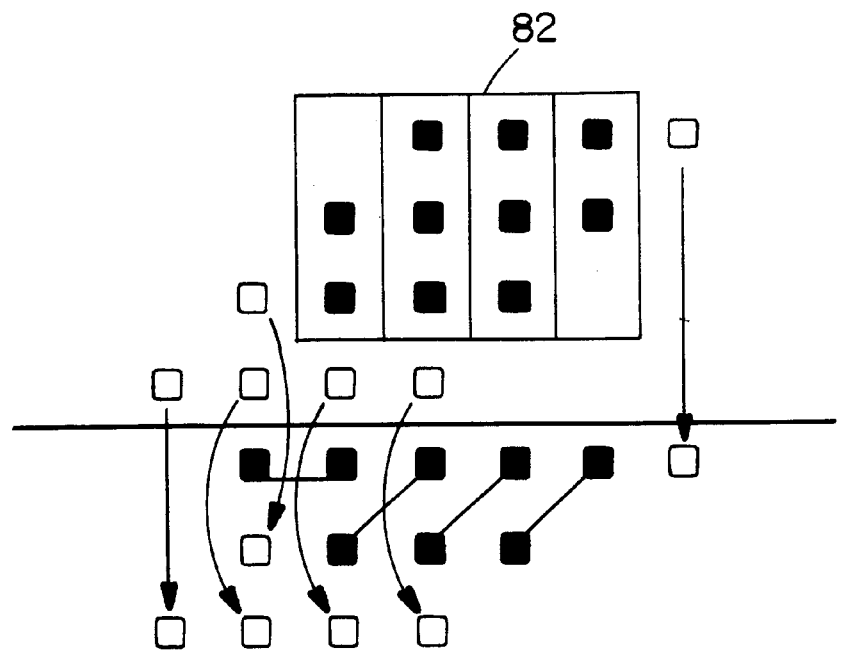
FIG. 8 illustrates processing in the first stage of a 4×4 multiplier using full adders.
Figure 9:
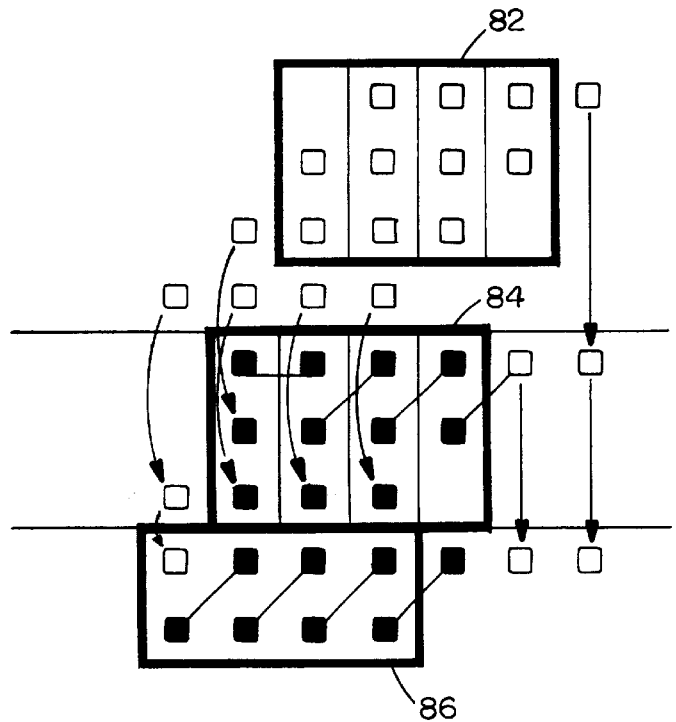
FIG. 9 illustrates three stages of the 4×4 multiplier.

The basic component of the preferred multiplier is a full adder, a circuit that takes three inputs and outputs the two-bit sum of their inputs. A full adder is illustrated using the symbol in FIG. 7. The use of squares instead of binary numbers is for generality and convenience. The three squares at the top show the three inputs of the full adder. The two squares at the bottom show the sum and carry outputs. The carry is to the lower left to indicate its place value is twice that of the sum. The first stage of the addition of a 4×4 multiplier is illustrated in FIG. 8. Above the summing line, 16 squares, some shown in black, some as white boxes, represent the bits of a partial product which has to be added. The bits shown in black will be added in the first stage using four full adders 82. The bits shown as white boxes are not to be added in the first stage, but simply transferred down as shown with the arrows in FIG. 8, in preparation for the next addition stage. The sum of the adders in the first stage is shown below the summing line. The second stage is shown in FIG. 9. Arrows once again indicate bits which are not operated on during this current stage and simply transferred down, while black boxes denote bits that are to be added in this current (second) stage. Once again, four full adders 84 are used to add the black box elements. At the output of the second stage produced by the full adders 84, there are two numbers which now must be added with a regular 4-bit carrying adder 86.

Figure 12:
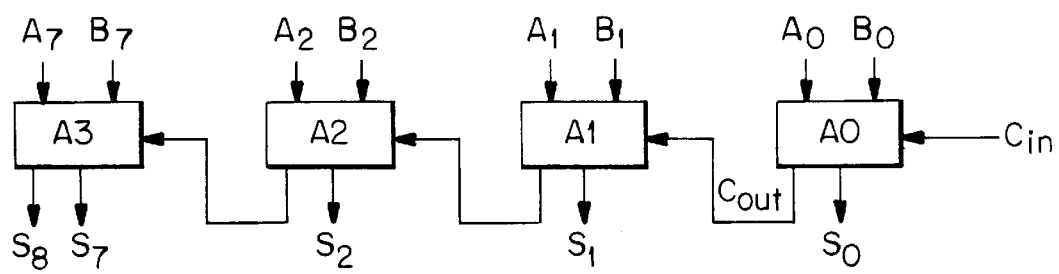
FIG. 12 illustrates a conventional implementation of an 8-bit adder using full adders.

A comparison of the performance of various adder and multiplier architectures helps to illustrate the advantages of the multiplier according to the present invention. A naive implementation of a 4-bit adder consists of four full adders A0–A3 in series as shown in FIG. 12. In this design, the carry out $C_{out}$ of the rightmost adder could potentially affect every one of the adder stages to the left of it. The critical path in this design is therefore four adder stages. Since the typical full adder consists of two or more logic stages, the total gate delay of an four-bit adder could exceed 8 stages.

Figure 13:
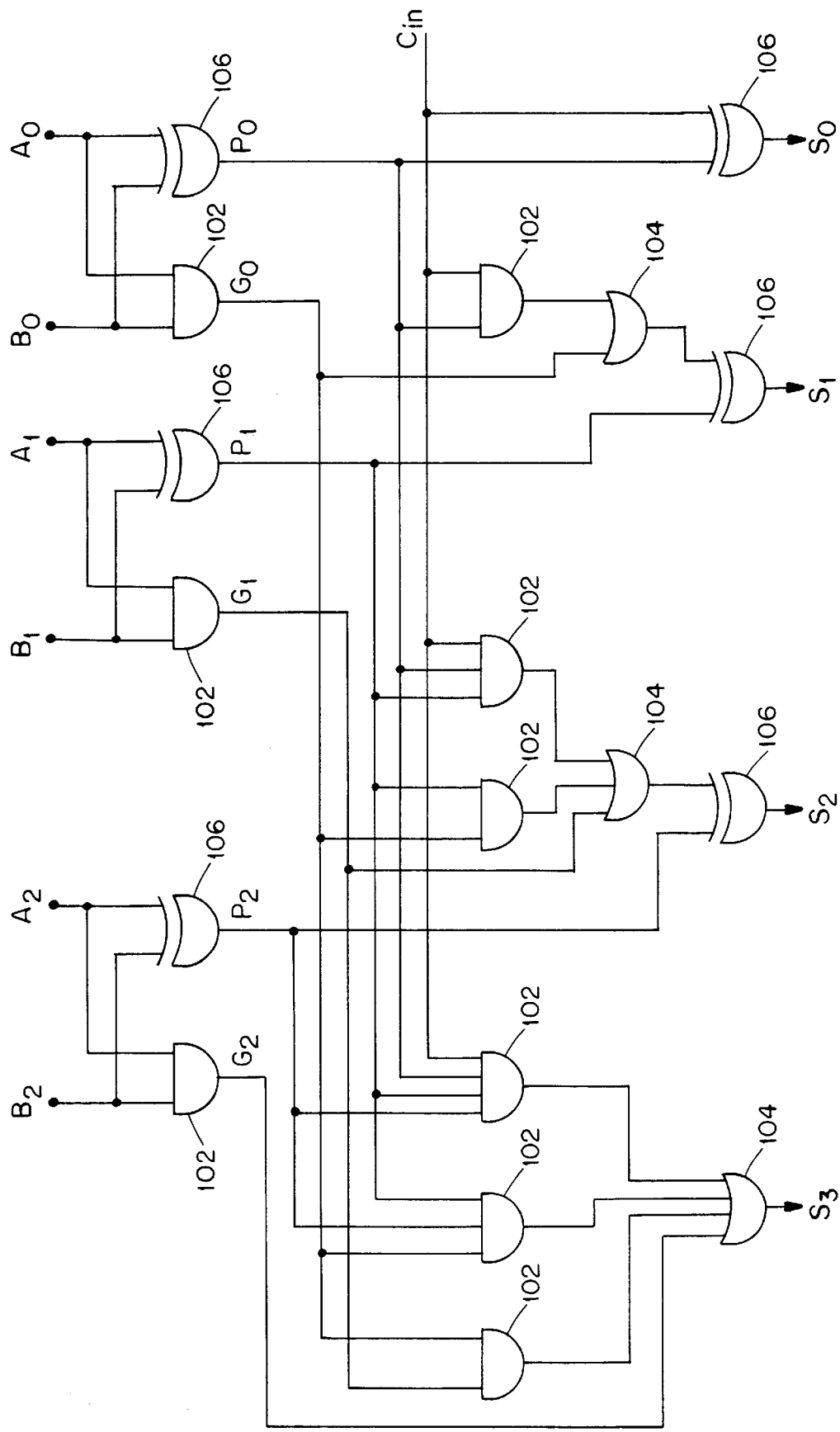
FIG. 13 is a conventional implementation of a carry lookahead adder.

An improved four-bit adder is a carry lookahead design. A three-bit carry lookahead adder is shown in FIG. 13. A four-bit design is only a little more complex. A detailed discussion of operation of the AND gates 102, OR gates 104 and Exclusive-OR gates 106 is not presented since this is a well known circuit. The advantage of a carry lookahead adder is that carries propagate to final sum bits in only four logic gates. More complex designs for wider numbers have more stages of logic, but they are still faster than a carry chain design.

In the full 4×4 multiplier, the carry save design creates a critical path through two full adders, plus the final carry lookahead adder. An implementation using only full adders would have a longer critical path since a naive adder using chained carries is slower than the carry lookahead adder. Finally, if we used full carry lookahead adders in the first two stages of the partial product summation, then the resulting multiplier would again be slower, since carry lookahead adders are slower than individual full adders. Note that the multiplier design according to the present invention never propagates a carry from one adder to another at the same partial product level. In this manner, the critical path through the multiplier is sure to include no more than two full adders in the first two stages of partial product summation.

Figure 10:
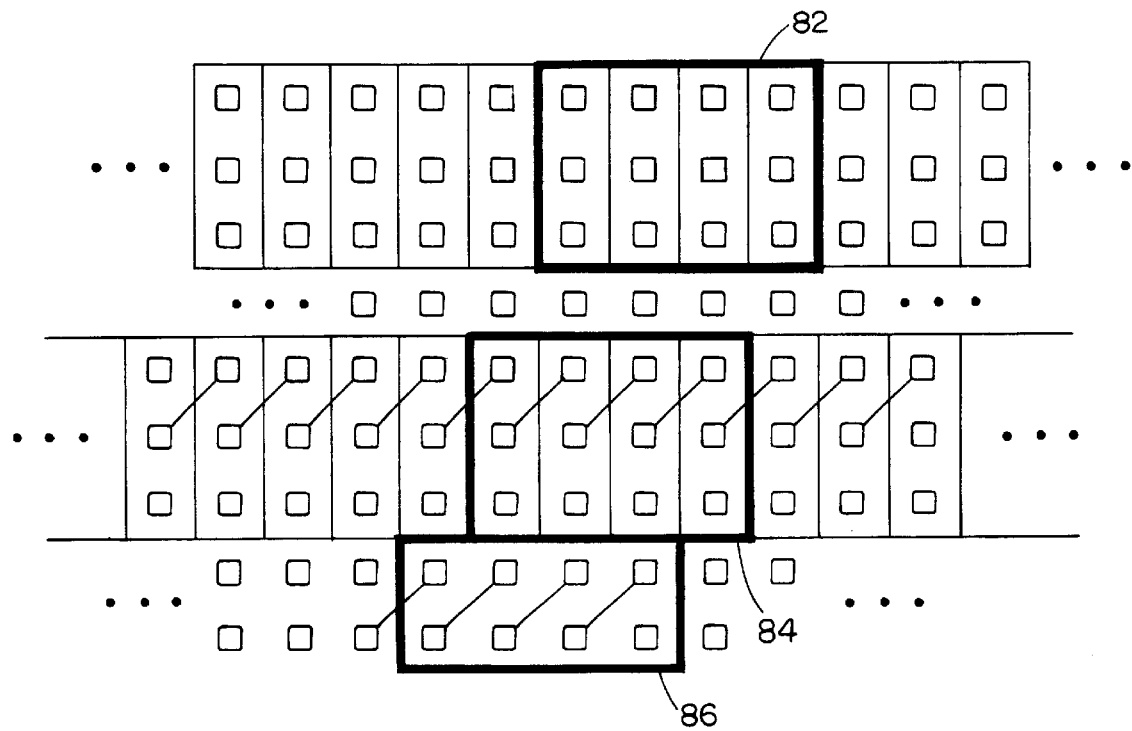
FIG. 10 illustrates the adders of a wide multiplier with the adders of the 4×4 multiplier overlaid thereon.

FIG. 10 illustrates a much wider 4×N multiplier. The large black boxes 82, 84, 86 denote the same full adder hardware that was used in FIG. 9. Note that full adders are necessary in this case, since in each circumstance, three inputs are being added together. In FIG. 9, simpler circuitry could have been used since not all circumstances required the addition of three inputs. However, in order to create a system which can handle a 4×N case, full adders are preferably used for all stages with some additional circuitry to determine how to treat a case with fewer than three inputs. Dual mode adders are therefore created, some having a multiplexer feeding one of their inputs to select between the output of a previous stage or a single bit partial product.

Figure 11:
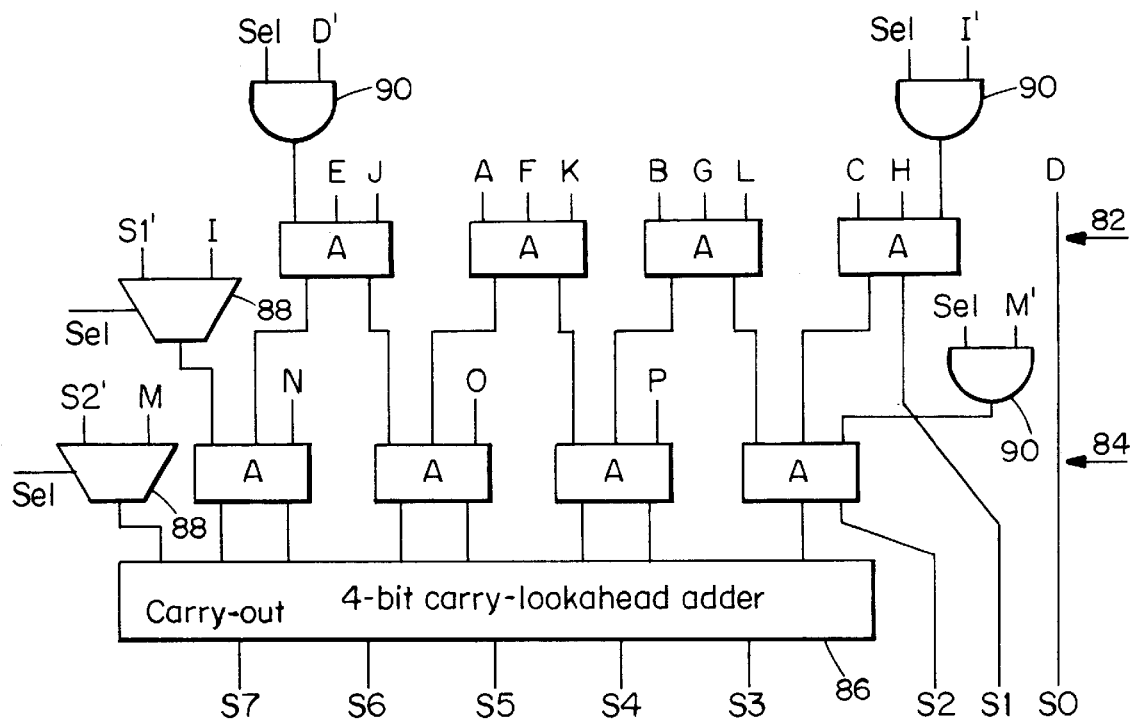
FIG. 11 is a block diagram of a 4×4 multiplier adapted to be concatenated with like multipliers in a wide word length multiplier of FIG. 10.

FIG. 11 illustrates the full adders A required to implement the boxed regions 82, 84, 86 of FIG. 10 with respective carry outputs at the lower left. In the preferred implementation, each adder A is a full adder. Some of the adders have only two inputs in the 4×4 case (i.e. the secret key case), while other adders have three inputs in the 4×N case (i.e. the public key case). The two input adders must have their third input gated with an enable signal. Some adders also require a multiplexer to provide one of their inputs to select between the output of a previous stage or a single-bit partial product. The carry-lookahead adder 86 on the bottom requires a carry-out every four positions to generate the last bit of the product in the 4×4 case.

In FIG. 11, the partial products of a 4×4 multiplier have been labeled to correspond with the following partial product scenario:

$$\begin{array}{cccc} A & B & C & D \\ E & F & G & H \\ I & J & K & L \\ M & N & O & P \end{array}$$

For a 4×N multiplier, the neighboring partial products must also be considered. They are labeled in FIG. 11 according to the following scenario:

$$\begin{array}{ccccc} D' & A & B & C & D \\ & E & F & G & H \\ & I & J & K & L & I' \\ & M & N & O & P & M' \end{array}$$

Note that D' is the neighboring (either to the left or to the right) equivalent of D. The 8-bit final sum is indicated as S7,S6,S5,S4,S3,S2,S1,S0 and the three lower-order bits of the left-hand neighbor's sum are S2',S1',S0'. The 2:1 multiplexer 88 has a selection signal Sel. In general, if Sel is logic 1, then the left input is passed to the output of the multiplexer; otherwise, if Sel is logic 0, the right input is passed to the output of the multiplexer. The Sel signal is also used to gate the AND gates 90. When Sel is logic 1, the other input to the AND gate is passed to the output; otherwise, with Sel at logic 0, the AND gates 90 are disabled and pass a logic 0 regardless of the value of the other input. Thus, in the implementation of FIG. 11, if Sel is logic 1, a segment of a 4×N multiplier can be implemented, with product appearing on outputs S6–S3. If Sel is logic 0, a 4×4 multiplier is implemented, with the 8-bit product appearing on outputs S7–S0. As such, the implementation of FIG. 11 illustrates a secret key multiplier element which can also be utilized as an multiplier element, which when concatenated with other like multiplier elements, will be used to implement the much wider width public key multiplier.

Example Implementations

Example implementations of common encryption algorithms will be now described with reference to the encryption chip preferred embodiment discussed above. RC5 is perhaps one of the simplest encryption algorithms to implement. It basically utilizes three types of operations: XOR, additions and rotations, all supportable by any one of the processing elements discussed above, as shown in Table 1. Although RC5 has a variable length block, most commonly, each round of the RC5 algorithm operates on a 64-bit data block plus a key value stored in Si1 and Si2 which are constants within each processing element, depending only on the round and the key. To encrypt data, a 64-bit input block is split into two 32-bit words which are then stored in locations A and B in the previous-neighbor memory, the output block is to be written to A_next and B_next in the next-neighbor memory. An example of a round of the RC5 encryption algorithm follows:

```
Loop:
    load r1, A
    xor r1, B
    rol r1, B
    add r1, Si1
    store r1, A_next
    load r2, B
    xor r2, r2, r1
    rol r2, r2, r1
    add r2, Si2
    store r2, B_next
    sync Loop
```

Each round requires 11 clock cycles. If the encryption chip is designed using a logic process that can run up to 400 MHZ, then 36 million blocks can be encrypted per second, or 288 MB/s in ECB mode. If we assume 12 rounds (a typical case for RC5), then compared to a conventional CPU running at the same clock speed, the concurrent execution of multiple PEs according to an embodiment of the present invention results in a 12-fold performance improvement over the conventional software implementation.

IDEA is one of the most secure block algorithms available and has a substantially more complex structure. It operates on 64-bit plaintext blocks. A 128-bit key is used. The same algorithm is used both for encryption and decryption. The main philosophy of the algorithm is to mix operations from different algebraic groups, operations such as XOR, addition modulo $2^{16}$, and multiplication modulo $2^{16}+1$. These operations are used to operate on 16-bit blocks.

IDEA therefore makes use of both modular multiplication and addition, which are expensive operations in software. The multiplication is complicated by DEA's treatment of zero: in a multiply, a zero is interpreted as (−1) modulo 65537. Assuming that the value 65537 has been pre-loaded into register r8 of the processing element's register file, and that register r0 contains zero, the following multiplication macro is presented for illustrative purposes:

```
MACRO MMULT(A,B,RESULT)
    cbra A==r0, L1
    load RESULT, #1
    sub RESULT, B, RESULT
    jump L2
L1:
    cbra B==r0, L3
    load RESULT, #1
    sub RESULT, A, RESULT
    jump L2
L3:
    mulm A, B, RESULT, r8
    andi #0xFFFF,RESULT
L2:
ENDMACRO
```

Each round of IDEA consists of modular multiplications, modular addition and exclusive-OR. The 128-bit key is broken down into subkeys. Each processing element's subkey is a function solely of the key and the processing element, and therefore can be computed in advance and stored in the PE. The plaintext input to IDEA consists of four 16-bit sub-blocks X1 through X4, as indicated earlier. Each round uses six subkeys K1 through K6, and can be coded as follows:

```
Loop:
    load r1, X1
    load r9, K1
    MMULT r1, r9, r1
    load r2, X2
    load r9, K2
    MMULT r2, r9, r2
    load r3, X3
    load r9, K3
    MMULT r3, r9, r3
    load r4, X4
    load r9, K4
    MMULT r4, r9, r4
    xor r5, r1, r3
    xor r6, r2, r4
    load r9, K5
    MMULT r5, r9, r5
    add r6, r5
    and r6, #0xFFFF
    load r9, K6
    MMULT r6, r9, r6
    add r5, r6
    and r5, #0xFFFF
    xor r1, r6, r1
    xor r3, r6, r3
    xor r2, r5, r2
    xor r4, r3, r4
    store r1, X1_next
    store r2, X3_next
    store r3, X2_next
    store r4, X4_next
    sync Loop
```

Since IDEA has eight rounds, the encryption chip hardware implementation according to an embodiment of the present invention accelerates the execution by a factor of eight or more. Additional acceleration is provided by the modular multiply instruction which is not available on most microprocessors. The above code requires roughly 50 clock cycles to perform one round. At 400 MHZ, the encryption chip can encrypt with IDEA at a rate of 64 MB/s, about three times faster than a 25 MHZ hardware implementation developed at ETH University in Zurich.

Data Encryption Standard, or DES, was originally designed for hardware implementation, and is therefore the most difficult to implement in software. Nevertheless, it can easily be coded in the encryption chip, according to an embodiment of the present invention.

Like the previous two algorithms, DES is also a block cipher encrypting data in 64-bit blocks. A 64-bit block of plaintext is the input and a 64-bit ciphertext is the output. Once again, both encryption and decryption use the same algorithm, making DES a symmetrical algorithm. DES creates subkeys from a single key, in this case 56 bits. The subkeys are a function of the PE and the 56-bit key, so they can be computed in advance.

Figure 14:
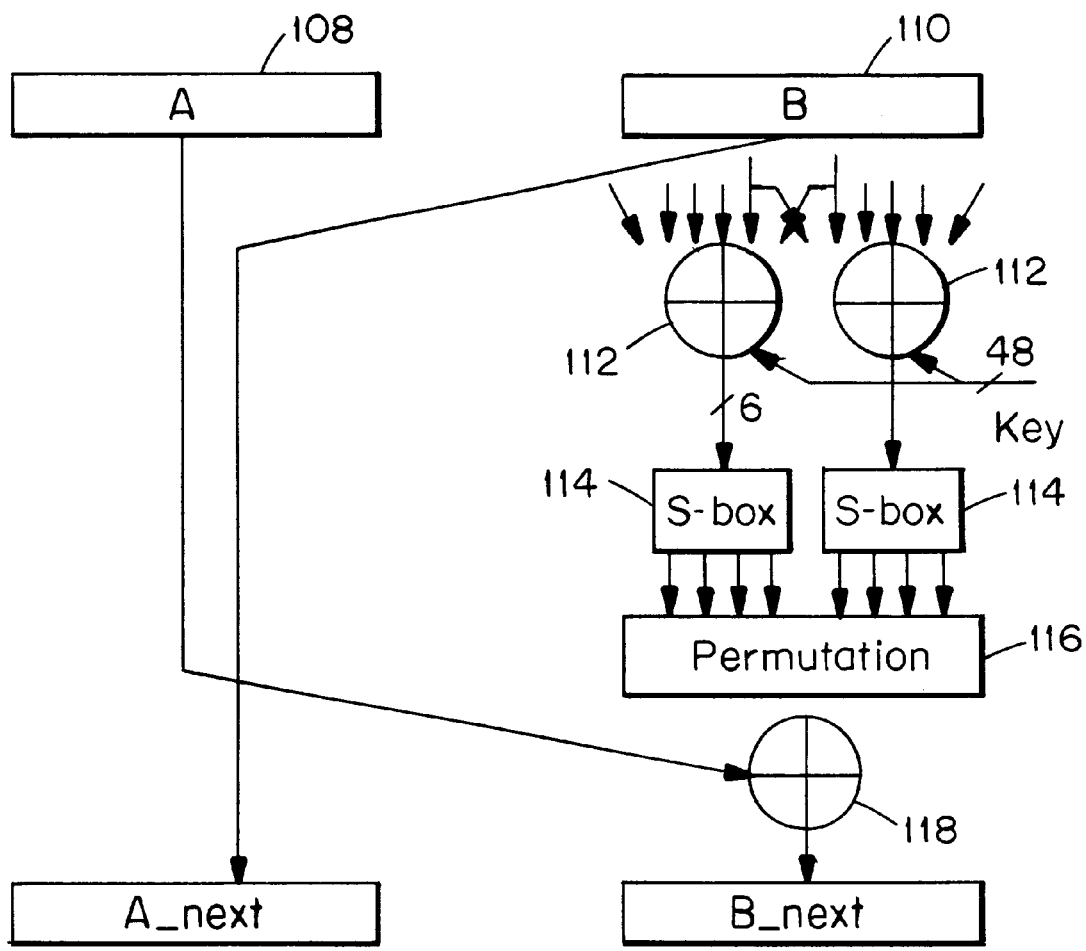
FIG. 14 is a block diagram illustration of a DES encryption round.

The basic concept behind DES, as illustrated in FIG. 14, consists of a substitution followed by a permutation on the text based on the key. The following operations make up the core of DES:

Expansion: The 64-bit block is divided into two 32-bit pieces 108,110. One piece is unaffected by the encryption. (The pieces are operated on every other round.) The piece that is affected is divided into eight groups of four bits. Each group is expanded by copying the two bits adjacent to it.

Each expanded group is XOR'ed at 112 with a subkey.

The six-bit result of the XOR is used to index a 64-entry× 4-bit lookup table 114 called an S-box. Each of the eight groups uses its own S-box.

The output from the S-boxes is permuted at 116: the bits are scrambled. Eight outputs yield 32 bits.

The 32-bit output is XOR'ed at 118 with the other 32-bit half of the block.

The operations can be coded as follows: expansion is performed by copying the input word, and masking bits such that there are two words: one representing even-numbered S-box inputs and one representing odd-numbered S-box inputs. The two words are XOR'ed with key information. The result is used to index the S-box lookup table. The data in each S-box is pre-permuted, so that the output of the S-box is 32-bit data. The final value is the logical OR of all components. Sample code follows:

```
Loop:
    load r1,A
    load r2,B
    load r3,r2
    store r2, A_next
    and r2,#0xF9F9F9F9
    and r3,#0x9F9F9F9F
    xor r2,K1
    xor r3,K2
    load r5,r0
    load r4,r3
    rol r4,#1
    and r4,#0x3f
    or r5,[r4+S1]
    load r4,r2
    ror r4,#3
    and r4,#0x3f
    or r5,[r4+S2]
    load r4,r3
    rol r4,#7
    and r4,#0x3f
    or r5,[r4+S3 ]
    load r4, r2
    ror r4, r#11
    and r4, r#0x3f
    or r5,[r4+S4]
    load r4,r3
    rol r4,#15
    and r4,#0x3f
    or r5,[r4+S5]
    load r4,r2
    ror r4, r#19
    and r4,#0x3f
    or r5,[r4+S6]
    load r4,r3
    rol r4,#23
    and r4,#0x3f
    or r5,[r4+S7]
    load r4,r2
    ror r4,#27
    and r4,#0x3f
    or r5,[r4+S8]
    xor r5,r1,r5
    store rS,B_next
    sync Loop
```

This sample code requires 44 clock cycles to perform one round. At 400 MHZ, a data rate of 72 MB/s can be achieved. This rate compares favorably with hardware implementations of DES available in the mid-1990's, that encrypt at rates ranging from 1–35 MB/s. VLSI Technology's VM007 can encrypt up to 200 MB/s.

In each of the above cases, performance has been shown to be much faster than a software implementation on a conventional CPU, but slower than a dedicated hardware implementation. The advantage of this invention over the hardware implementations is that the encryption chip is programmable, so that it may implement any algorithm, including those that have yet to be conceived.

Although no specific public key algorithm examples have been given, it should be noted that similar improvements over existing approaches will result by employing the techniques as discussed in the preferred embodiment of the present invention.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A programmable encryption device to process a plurality of secret key and public key encryption algorithms comprising, on a single chip:

an array of processing elements which process successive rounds of an encryption algorithm in a processing element pipeline;

a public key core processor which performs a public key encryption algorithm;

global memory for global communication among the processing elements and for data transfer to and from the public key core processor; and a control CPU which controls operations of the encryption device.

2. An encryption device as claimed in claim 1 further comprising a global data bus connecting the array of processing elements, the global memory and the control CPU.

3. An encryption device as claimed in claim 1 further comprising I/O communication logic through which the encryption device is programmed from a host CPU.

4. An encryption device as claimed in claim 1 further comprising:

an input stage which receives a data stream to be encrypted and converts the data stream to block aligned data suitable for processing in the array of processing elements; and an output stage which converts encrypted data to a data stream to be output from the encryption device.

\* \* \* \* \*